INVENTOR.
Etheridge M. Iverson
BY John T. Maynard

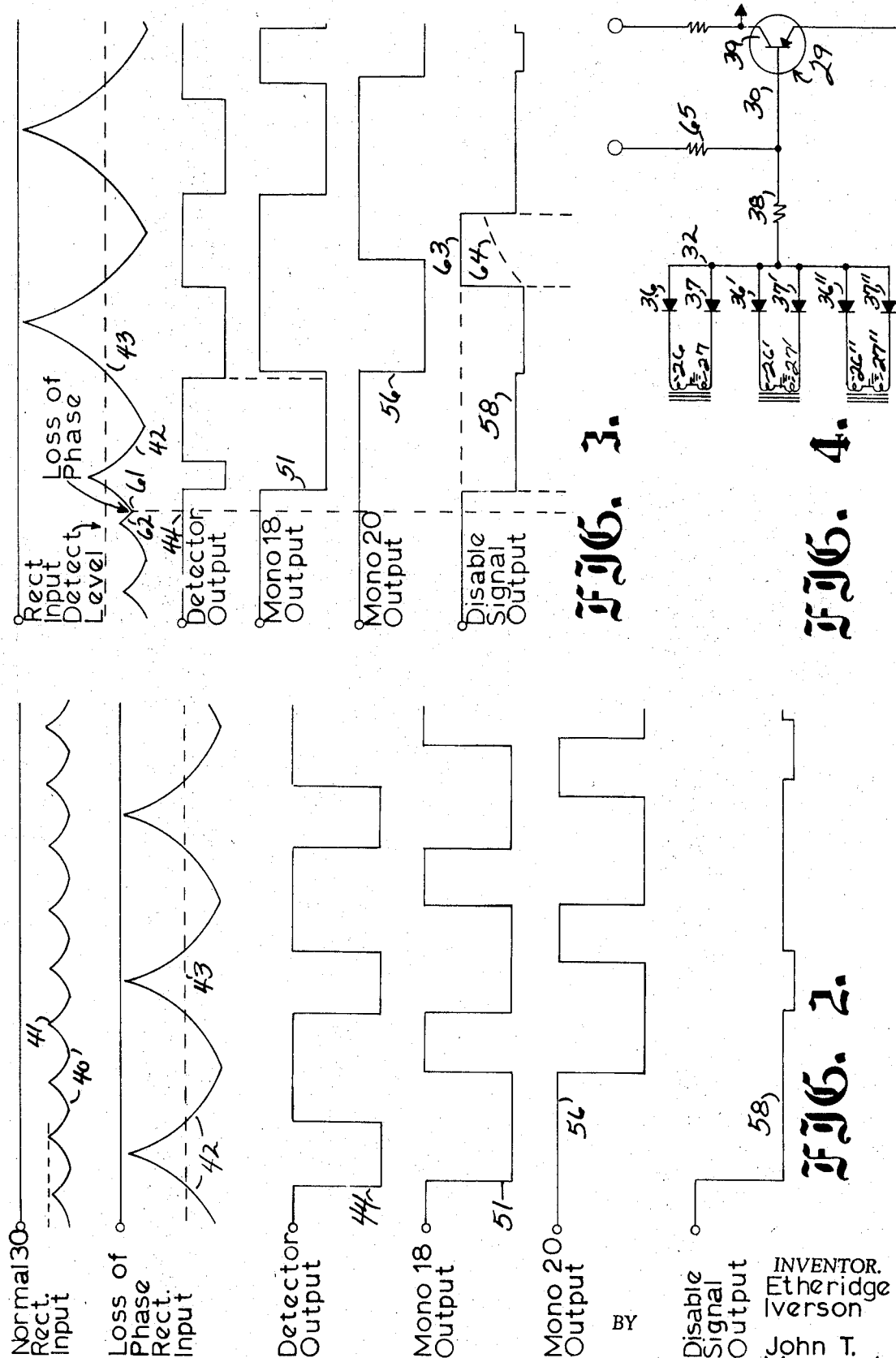

United States Patent Office 3,536,957
Patented Oct. 27, 1970

3,536,957
POLYPHASE CIRCUIT INPUT FAULT DETECTION SYSTEM
Etheridge M. Iverson, Milwaukee, and John T. Maynard, New Berlin, Wis., assignors to A. O. Smith Corporation, Milwaukee, Wis., a corporation of New York
Filed Oct. 10, 1968, Ser. No. 766,586
Int. Cl. H02h 7/09, 3/26
U.S. Cl. 317—13                                  18 Claims

ABSTRACT OF THE DISCLOSURE

This disclosure relates to detection of an effective loss of a phase voltage of a three-phase power supply to a pair of full-wave rectifiers connected in parallel to a direct current reversible motor. Three separate single-phase reference transformers are connected one to each phase of the three-phase supply and to a pair of rectifiers to product a full-wave rectified signal and a half-wave rectified signal. The first signal is connected as an input to a detecting transistor and the second signal is applied thereto as a floating bias. The transistor actuates a monostable circuit which actuates a second monostable circuit. The two monostable circuits are connected to an emitter follower transistor to produce an essentially continuous disable signal if a phase voltage is lost. A sample and hold circuit maintains the disable signal for a timed period until the input stabilizes.

---

This invention relates to a polyphase circuit input fault detection system and particularly to a detection system which will provide instantaneous low line and/or phase loss detection and circuit disconnection under running conditions.

Polyphase circuits, particularly of the three-phase variety are widely employed in industrial power applications. A particularly satisfactory system for energizing direct current motors and the like is shown in the copending application of John T. Maynard, entitled "Dynamoelectric Control Circuit" which was filed on Mar. 14, 1968 and with Ser. No. 713,247. As disclosed therein, a pair of full-wave, three-phase rectifying circuits are connected in parallel to selectively energize the armature of a motor for both motoring and regenerating modes of operation. The rectifying units employ controlled unidirectional switches such as silicon control rectifiers in each leg or branch of the unit. Such devices, however, rely on the presence of a proper line voltage at all times to provide turn-off of the rectifier. If, for any reason, the line voltage is insufficient to turn off the previously conducting control rectifier, a short circuit condition may be established with the resultant blowing of fuses and/or damaging of the control rectifiers as well as the other components in the circuit. The condition of a low line voltage on any given phase can result from a phase-to-phase short. For example, insulation breakdown within the conductors or an improper connection made on some other part of the line will establish such a fault. A similar condition will arise as a result of grounding of one or more of one of the phases. In order to properly protect such circuits, the detection of the fault and the response of the protective circuit must be extremely rapid in order to disable or prevent the continued sequential firing of the control rectifiers after the sensing of the fault. Further, the detection and protective system must maintain a disable signal sufficiently long to completely cut down the system in the presence of a fault and preferably should automatically reset, if in fact, the fault is of a transient nature. For practical reasons, the detection circuit should be readily and easily maintained to minimize the down time of the load, such as the motor.

The present invention is particularly directed to a sensing and protective circuit which operates sufficiently rapidly in response to a low phase voltage signal to prevent blowing of the fuses and/or damaging of the circuit components.

The circuit may automatically re-enable the system if only a transient fault is established. In the presence of a continuous fault of a selected period, the disable signal completely disables the system.

The sensing and protective circuit of this invention may be generally formed as a modular, solid state control circuit. As a result, the circuit will normally have a long, reliable life. In the event of a failure, however, it may be readily serviced with a minimum down time of the motor or other load.

Generally, in accordance with the present invention, a sensing means is interconnected to the polyphase power line and a square wave generator means. In the presence of a normal full wave polyphase signal, the output of the generator is held at a given level. If a phase voltage is lost or the amplitude decreases below a selected level, the generator means is actuated to establish a square wave signal of a selected period. The output of the generator means is interconnected to trigger a second similar square wave generator means to produce a similar output which is time shifted to overlap with that of the first signal generator means. The two generator means are interconnected as a dual input to a comparator or summing device to establish a continuous enable or disable signal, depending upon the conjoint output of the two generating means.

In a particularly novel three-phase motor system, three single-phase reference transformers are connected to the three-phase power line. The output of each transformer is connected to a pair of rectifiers to produce a first full-wave rectified direct current signal proportional to the amplitude of the three-phase output, and a second half-wave rectified direct current signal proportional to the amplitude of the one-half cycle. The first signal is connected to a detecting amplifying means such as a transistor. The second signal is applied as a floating bias to the transistor or other amplifying means. Although a fixed bias can be employed, applicant has found that under a regeneration mode of operation, the line voltage increases with a corresponding increase in the output. This effectively proportionately reduces the detection level with the fixed bias. In contrast, the floating bias maintains a preselected detection level, both during positive motoring and regenerating modes of operation of the motor and maintains rapid detection under both operating conditions.

The output of the detecting amplifying means is interconnected as an input to a monostable circuit. With the three-phase input above a selected minimum level, the monostable circuit is held at a given output level, maintaining an enable signal. However, if a phase is lost or if the instantaneous line voltage of any given phase drops below a selected level, the monostable circuit is triggered to produce a square wave output. The square wave output is applied to a logic converter circuit which inverts the square wave circuit and applies it to a second monostable circuit, which produces an output, the inverse of the first monostable circuit.

The outputs of the two monostable circuits are interconnected to a comparator or summing device which provides an output in accordance with the relative signal from the two monostable circuits. The comparator, for example, can be an emitter follower connected transistor interconnected to the two monostable circuits through suitable blocking diodes. When a phase voltage is lost or the line voltage drops below a selected minimum, the output of the two monostable circuits actuates the comparator to produce an essentially continuous disable signal.

The transition from a three-phase output to a single-phase output may not be instantaneous, during which transition period an enabling signal may appear. The presence of the fault is not fully detected, with a consequent possible damaging of the system in blowing of fuses. In accordance with the present invention, a sample and hold circuit is inserted between the output of the comparator and the disabling means for the control rectifiers or other similar switch means. The sample and hold circuit maintains the disable signal from the comparator for a short selected time period. The sample and hold circuit will maintain the disable signal until the input stabilizes. This provides for positive disabling of the system in response to a fault while allowing automatic clearing and resetting of the system in the presence of a transient fault.

The present invention has been found to respond sufficiently rapidly during either motoring or regenerating operation of a three-phase motor to disable the system in response to either a loss of one-phase or low-phase voltage condition without disruption of the circuit fuses or damaging of components.

The drawings furnished herewith illustrate the best mode presently contemplated by the inventors for carrying out the subject matter of this invention and clearly disclose the above advantages and features as well as others which will be readily understood from the following description.

In the drawings:

FIG. 2 is a graphical illustration of the output traces at certain points of the fault detection circuit in the presence of a phase loss;

FIG. 3 is a view similar to FIG. 2 similarly showing the outputs as established with a transition from the three phase to single phase over a given time period; and FIG. 4 is a schematic circuit diagram of an alternative circuit for a portion of the detection circuit shown in FIG. 1.

Figure 1:
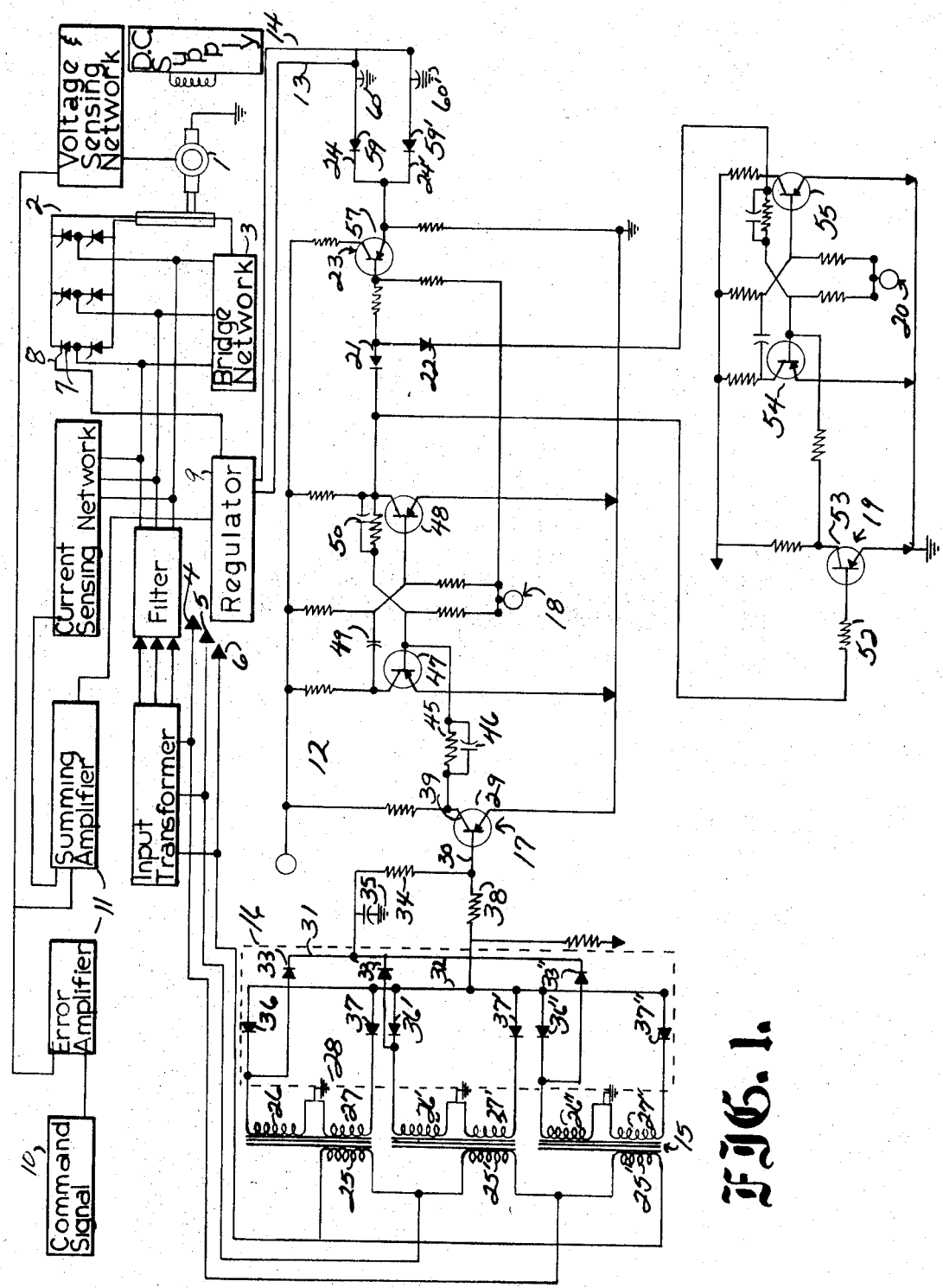
FIG. 1 is a schematic illustration of a motor control circuit showing a basic servo loop system in block diagram in combination with a circuit input fault detection system circuit in accordance with the present invention.

Referring to the drawing and particularly to FIG. 1, the present invention is shown applied to a motor control circuit generally in accordance with the teaching of the previously referred to copending Maynard application. Generally, a direct current motor 1 is connected through a pair of paralleled three-phase full-wave bridge rectifier units 2 and 3 to a set of three-phase power lines 4, 5 and 6. Each of the bridge rectifier units 2 and 3 includes silicon controlled rectifiers 7 in each of the six legs of a usual three-phase full-wave bridge connection. Each of the silicon control rectifiers 7 similarly is of the usual or conventional construction having the main anode-cathode circuit connected to the output side of the rectifying units and having a gate 8 interconnected to a gate regulator 9 for controlled firing of the rectifiers 7. The gate regulator 9 has its input connected into a servo or feedback network and is controlled in such a manner as to apply a proper signal to the gates 8 of a pair of rectifiers 7 during either motoring or regenerating of operation of the motor 1 to selectively and properly fire the bridge rectifier units 2 and 3 for conduction with respect to the motor 1. Generally, the output or control signal controlling regulator 9 is derived from a command signal unit 10 which is fed into an amplifying and summing network 11 in combination with suitable motor voltage and motor current feedback signals, as more fully disclosed in the previously referred to Maynard application. The present invention is particularly related to the problems and the fact that the three-phase lines 4, 5 and 6 must be properly interconnected to the bridge rectifying units 2 and 3 and must maintain a phase voltage of a selected magnitude on the anode to cathode circuits of the silicon controlled rectifiers 7 to maintain proper operation of the circuit. This is true because once fired to conduct, the silicon controlled rectifiers 7 remain in a conductive state until such time as the current drops below the holding level or a positive turn-off voltage is applied across the anode to cathode circuit. In a motor circuit, particularly in a regenerating mode where the counter electromotive force of the armature adds to the line voltage, an improper phase sequence or loss of a sufficient turn-off phase voltage under running conditions maintains the previously fired rectifier conducting with resulting short circuit condition within the circuit.

A phase sequence and level detection circuit 12 is also interconnected to the three-phase power lines 4 through 6 inclusive. The detection circuit includes a pair of output or disable-enable lines 13 and 14 connected respectively into the circuit of the digital gating regulator 9 to selectively control the transmission of gating signals to corresponding bridge networks 2 and 3. For example, the copending application of John T. Maynard entitled, "Bi-Directional Power Circuit Having Crossover Control Means" which was filed on Apr. 18, 1968, with Ser. No. 722,413, discloses a "nor" circuit system including means for controlling the transmission of gate signals to the bridge rectifiers. The disable lines can be connected to the corresponding terminals of the "nor" circuit shown in that application to control the firing the rectifiers 7.

Generally, the detection circuit 12 includes a phase detection transformer 15 interconnected to the power lines 4 through 6, inclusive. A rectifier unit 16 is connected to the output of the transformer 15 and to a level detector 17. The output of the level detector 17 maintains an enable signal unless the output of the phase transformer 15 indicates a loss of phase or a decrease in the amplitude of any phase below a selected level.

The output of the level detector 17 is interconnected to actuate a square wave generating circuit 18, which when triggered by a low voltage input, which is a selected percentage of the normal peak of the three-phase voltage, produces a square wave output signal. The circuit 18 is normally energized to maintain a constant level logic signal which holds an enable signal at lines 13 and 14.

The output of the circuit 18 is also connected through a logic inverter 19 to a similar second square wave generating circuit 20. The output of the second circuit 20 is similar to the first circuit 18, but being triggered by the latter through the logic level inverter 19 shifts its wave form to overlap that of the first circuit 18. The circuits 18 and 20 are interconnected by coupling diodes 21 and 22, respectively, to a common input of summing circuit 23 shown as an emitter follower transistor circuit which functions to provide an output in accordance with the conjoint control of the two circuits 18 and 20 as a result of the shifting of the relative output of logic levels of the two traces or signals from the circuits 18 and 20. The summing circuit 23 establishes a continuous disable signal in response to a disable signal from the level detector 17.

A pair of sample and hold circuits 24 and 24' are connected between the circuit 23 and the lines 13 and 14 to compensate for a circuit operation during delayed transition from a three-phase to a single-phase output under certain conditions, as hereinafter more fully described in connection with the preferred construction of the embodiment of the invention, to maintain a disable signal in response to the initial establishment thereof.

More particularly, the reference or phase detection transformers 15 are three single-phase transformers having the primary windings 25 connected to the lines 4 through 6, inclusive, in a delta circuit connection. The secondaries of the transformers include individual center-tapped phase windings defining a pair of secondary windings 26 and 27 connected in series with each other for each phase. The secondary output of the transformers are connected to a rectifier unit 16 which in turn actuates the level detector 17. Three separate transformers 15 are employed to magnetically separate the transformer and thereby establish accurate sensing of a phase voltage drop or loss. If a three-phase transformer is employed, a phase loss results in an open delta circuit operation with the other phases combining to maintain a reduced third phase voltage. The three separate transformers therefore provide a more significant voltage change in response to a phase loss and the like.

The level detector 17 is shown as a single PNP transistor 29 connected in a common emitter configuration to a suitable low voltage DC power supply system. The base 30 of the transistor 29 is connected to the output of the rectifier unit 16 through a common bias line 31 and a common signal line 32.

The secondary windings 26 and 27 for each phase are connected to correspondingly similar components of rectifier unit 16 and the uppermost phase secondary windings of FIG. 1 are described in detail. Corresponding elements of the other two-phase windings and the rectifier unit 16, including their circuit connections are identified by corresponding primed and double primed numbers, respectively.

The center tap of the windings 26 and 27 is connected to ground as diagrammatically shown at 28.

The rectifier unit 16 includes a diode 33 connected to the upper end of the winding 26 of the transformer secondary and to the common bias lead 31. A series resistor 34 interconnects the common bias lead 31 to the base 30 of the transistor 29, and a smoothing capacitor 35 connects the common bias lead 31 to ground. The rectified output of the transformer 15 provides a half-wave rectified bias voltage to the transistor 29. Therefore, any change in the amplitude of the power supply results in a proportionate change in the bias on the transistor, and consequently increases in a negative direction the detection level. This establishes a floating of line voltage related bias on the transistors and maintains accurate detection at a selected percentage of line voltage. This is particularly significant when the motor regenerates and the line voltage normally increases.

A pair of diodes 36 and 37 interconnect the opposite ends of the two series connected windings 26 and 27 to the common signal lead 32. A coupling resistor 38 connects the signal lead to the base 30 of the transistor. The output established by the diodes 36 and 37 produces a full-wave rectified secondary voltage, proportional to the phase voltage.

The transistor 29 establishes a logic level output signal at the collector 39 in accordance with the input signal and the bias level signal applied to the base. The presence and level of this voltage is detected by the level detector for control triggering of the circuits 18 and 20. Referring particularly to FIG. 2, a series of traces are shown for indicating the output condition as a result of a phase loss. The traces include a normal three-phase, full-wave, negative rectified voltage trace 40 which establishes a minimum DC output. In an actual construction, the output of the reference transformer was selected to provide a peak voltage of a minus 17 volts and a minimum voltage of a minus 13 volts at the junction 41 of successive half-cycles under normal phase conditions. A minus 12 volts corresponding to essentially 70% of the peak voltage was selected as the detection level at which the triggering of the controlled rectifiers 7 should be disabled. When a phase loss occurs, the output of the transformer becomes a single phase voltage which is full wave rectified. A single, enlarged phase full-wave rectified trace 42 is shown in FIG. 2, with the detection level being shown by the phantom line 43 parallel to the horizontal axis. The bias on the detector transistor 29 is such that as long as the control signal is more negative than a minus 12 volts, the transistor 29 conducts and the output at the collector 39 is held at a logic level 0. If the output reverts to a single phase, as shown at trace 42, the intercept of the half-wave voltage with the detection level line 43 causes the transistor to switch from a conducting to a nonconducting state with the voltage at the collector 39 rapidly dropping and establishing a logic 1 output, as shown by trace 44 in FIG. 2. This level is maintained during the period between the peaks of successive half-wave rectified voltages which are more positive than the minus 12 volt detection level. It thus provides a positive logic 1 pulse to the circuit 18.

The output of the level detector transistor 29 is connected through a parallel resistor 45 and capacitor 46 as the input to the circuit 18.

The illustrated circuit 18 is a transistorized triggered monostable circuit employing a pair of transistors 47 and 48 connected in a common emitter configuration. A suitable capacitor-resistor network 49 interconnects the output of the transistor 47 to the input of the transistor 48 and a suitable capacitor-resistor network 50 interconnects the output of the transistor 48 to the input of the transistor 47. The collector 39 of the level detector transistor 29 is connected to the input of the transistor 47. With the level detector at a logic 0 level, the monostable circuit 18 is in a quiescent operating state. In this condition, the output transistor 48 is normally conducting and provides a corresponding logic 0 output signal. When the level detector transistor 29 turns off and a logic 1 level is created, it provides a pulse signal to the transistor 47 which shifts the operating point of the monostable circuit 18 from the initial stable region to a second region of operation which is maintained as a result of the interconnected resistive-capacitive networks for a selected period of time after which the operating point moves back to the opposite region. Thus, by the application of an initial signal to the transistor 47, the conducting states of the transistors 47 and 48 are reversed for a selected time period, which is controlled by the particular capacitance and resistance values inserted in the feed-back networks between the transistors.

In the presence of a phase-loss voltage trace 44, the monostable circuit 18 is triggered by each of the changes in the output level from a logic zero to a logic 1. The output of the monostable circuit 18 is shown by the trace 51 in FIG. 2. The monostable circuit 18 is constructed and designed in accordance with the present invention to have a run-out or reversion time somewhat greater than the maximum period between the half-wave rectified pulses taken along the minimum detection level line 43. The output of the monostable circuit is therefore a square wave trace having the logic 1 level maintained for a somewhat longer period than the logic zero level.

A coupling resistor 52 also connects the output of the monostable circuit 18 to the input of the logic inverter 19, which in turn is connected to actuate the second circuit 20.

The logic inverter 19 is shown as a PNP transistor 53 which produces an output which inverts the polarity of the signal while maintaining the same logic conditions. The monostable circuit 20 includes a pair of transistors 54 and 55 interconnected to each other in essentially the same manner as that shown for monostable circuit 18. Normally, the transistor 55 is conducting and maintains a logic 0 output.

A logic 0 output at monostable circuit 18 results in a corresponding logic signal from the inverter 19. The change from logic 1 signal to a logic 0 signal from the monostable circuit 18 which is applied through the inverter 19 triggers the monostable circuit 20 to establish corresponding timed logic 1 signal.

The output of the monostable circuit 20 is a square wave signal such as shown by trace 56 in FIG. 2. The monostable circuit 20 has a runout time generally corresponding to that of the circuit 18 and thus extends beyond the reset period of the monostable circuit 18 in the presence of a continuous phase loss. As a result, the trace 51 and the trace 56 of the circuits 18 and 20 overlap and are adapted to maintain a continuous disable signal in the presence of a phase loss, as follows:

The coupling diode 21 connects the output of the circuit 18 to summing circuit 23 to establish a disable signal at the output lines 13 and 14, for the period corresponding to the logic 1 level. The coupling diode 22 similarly connects the output of the transistor 55 of the monostable circuit 20 to the summing circuit 23.

The illustrated summing circuit is a PNP transistor 57 interconnected in a well known follower configuration with the output taken from the emitter and applied to the sample and hold circuits 24 and 24'. The application of the overlapping signals of the monostable circuits 18 and 20 to the emitter transistor 57 thus establishes a continuous logic 1 signal from the emitter follower to the circuits 24 and 24', as shown at 58 in FIG. 2.

Each of the sample and hold circuits 24 and 24' is similarly constructed and connected to the output of transistor 57. Circuit 24 includes a polarized diode 59 connected to the emitter follower transistor 57. A capacitor 60 is interconnected between the output side of the diode 59 and ground, with the output lead 13 connected to the junction of the diode 59 and the capacitor 60. The capacitor 60 and diode 59 are selected to define a time constant which holds the output at a logic 1 level for a predetermined time of sufficient length to maintain the disable signal if the transition from three-phase to single-phase is not instantaneous, for example, as shown in FIG. 3. Generally, the traces of FIGS. 2 and 3 are for the corresponding elements of circuit 1 and, consequently, the several traces are similarly numbered. If a phase loss occurs during the peak portion of a given phase, voltage such as shown at point 61 of the phase trace 62, the related winding continues to produce an output which crosses line 43 to trigger the detector transistor 29 and initiates the sequential pulsing of circuits 18 and 20. However, the last phase intercepts the next succeeding phase voltage corresponding to the continuing single-phase trace 42 which rises to cross line 43 a short time thereafter. This results in a shortened period between adjacent pulses in accordance with the normal three-phase overlap of the full wave rectification of a three-phase power system. However, the time period of the monostable circuit 18 is a fixed period and as shown in FIG. 3, extends beyond the subsequent intercept of the first pulse of trace 42 with the level detection voltage line 43. Consequently, the monostable circuit 18 has not reset and is not again triggered to start a new timing cycle when the trace 42 drops below line 43. Consequently, the trace 44 rises to a logic zero or an enabling level.

The monostable circuit 20 is triggered upon the initial resetting of the monostable circuit 18 and consequently it establishes a logic 1 output and as a result of the overlap with the output monostable circuit 18 maintains a disable signal at the lines 13 and 14. However, circuit 20 times out before the monostable circuit 18 is again triggered and in essence results in an enable signal being superimposed upon the disable signal during a portion of each of the initial cycles, as shown at 63 in FIG. 3. The sample and hold circuit 24 and 24' establish a timed discharge maintaining a signal at lines 13 and 14 below logic zero and sufficient to hold the circuit disabled, as at 64. The discharge time is selected such that the monostable circuit 18 is again triggered before the signal increases sufficiently to enable the regulator 9. Thereafter, the single-phase output provides traces as shown in FIG. 2 to maintain continuous disabling of the triggering of the controlled rectifiers 7.

Thus, the present invention provides a continuous monitoring of the phase voltage and of the presence of all phases. The circuit responds sufficiently rapidly to establish turnoff or disabling of the circuit before the fuses can be blown or the components can be damaged as a result of short circuiting conditions resulting from low line voltage or loss of phase voltage.

Applicant has found that the circuit reliably protects direct current motors and in a system such as shown in FIG. 1 in both motoring and regenerating modes of operation over normal operating temperatures. Although the circuit does not protect against the simultaneous failure of all three phases while regenerating, such a condition is such an unlikely occurrence that the circuit has been found to provide the necessary reliable output for motor controls and the like.

Referring particularly to FIG. 4, a fixed bias input circuit for detector transistor 29 is illustrated with elements corresponding to those of FIG. 1 similarly numbered. The secondary windings are connected directly to the common signal line 32 by the related diodes. The common signal line 32 is coupled through the resistor 38 to the base 30. A bias resistor 65, however, is connected directly to a suitable positive fixed power supply to maintain a fixed bias on the transistor to hold it in an off condition. Such a detection system is satisfactory for motoring conditions where the rectified voltage is made sufficiently larger to overcome the bias supply. The fixed bias becomes less effective during regeneration mode, as previously noted, because the line voltage normally increases during regeneration, with a resulting percentage increase in the output of the reference transformer secondary voltage. The increased voltage thus is reflected in the signal to the level detector and proportionately reduces the detection level. The circuit would, however, be satisfactory for motors which do not regenerate and other loads.

The present invention thus provides an improved means for protecting polyphase circuits against phase loss and reduced phase voltages.

Various modes of carrying out the invention are contemplated as being within the scope of the following claims particularly pointing out and distinctly claiming the subject matter which is regarded as the invention.

We claim:

1. A polyphase input fault detection system for controlled energizing of a load from polyphase lines comprising, sensing means connected to the polyphase lines and establishing a control signal with any phase voltage below a selected detection level, first converter means connected to the output of said sensing means to establish a first periodic disable signal in response to said control signal, second converter means connected to the output of the first converter means and establishing a similar periodic disable signal in response to reset of the first converter means, and a summing means having a pair of signal input means connected to said first and second converter means and providing a disable signal in response to said periodic signal.

2. The polyphase input fault detection system of claim 1 wherein, said sensing means establishes a first control signal with all phase voltages above a selected detection level and a second control signal with any phase voltage below said selected detection level, said first converter means establishing an enable signal in response to said first control signal and a first periodic disable signal in response to said second control signal, said second converter means establishing a similar-periodic disable signal in response to reset of the first converter means, and said summing means providing an enable signal in response to said first control signal and a disable signal in response to said periodic signals.

3. The input fault detection system of claim 1 wherein the output of said sensing means is a full wave rectified signal establishing a pulsating direct current signal voltage, and having a detector means connected to said sensing means and the first converter means and responsive to the selected detection level, said detection level being less than the intersection of the successive half cycles of the polyphase output signal and greater than the corresponding intercepts with one phase of said polyphase input below a selected peak level.

4. The input fault detection system of claim 1 wherein the said sensing means includes a full wave rectifier connected to the incoming phase lines and establishing a pulsating direct current signal voltage, and having an amplifying detector means connected to said sensing means and the first converter means and responsive to the selected detection level, a half wave rectifying means connected to said incoming phase lines and connected to said detector means to bias said detector means to respond to said detection level, said detection level being less than the intersection voltage of successive half cycles of the polyphase output signal and greater than the corresponding intercepts with one phase of said polyphase input below a selected peak level.

5. The polyphase power circuit of claim 1, wherein said first and second converter means establish an essentially continuous disable signal having superimposed enable signal during an initial transition from a full polyphase output to reduction in at least one phase voltage, and
- a holding circuit means connected to the summing means and establishing a timed signal in response to a disable signal to hold a disable signal output during said transition.

6. The polyphase power circuit of claim 5, wherein said holding circuit means includes a diode means and capacitor means connected to the output of the summing means and establishing said timed signal.

7. The polyphase input fault detection system of claim 1, having
- said sensing means establishing a full wave rectified output signal and having detector means connected to said sensing means and establishing a first logic signal in response to the intercept of the successive half cycles of the full polyphase output signal and a second logic signal in response to the intercept of successive half cycles of the rectified signal with said detection level with an effective loss of a phase voltage,
- said first converter means being connected to the output of said detector means and establishing an enable signal in the presence of said first logic signal and a first square wave signal in response to the second logic signal,
- said second converter means connected to the output of the first converter means and establishing a similar enable signal, said second converter means being actuated by each reset of the square wave signal of the first converter means to establish a square wave signal, and
- said summing means having a pair of signal input means connected to said first and second converter means and providing an enable signal in response to said enable signals and a disable signal in response to said square wave signals.

8. The polyphase power circuit of claim 7 wherein first and second converter means establish an essentially continuous disable signal, having superimposed enable signal during the initial transition from the polyphase output,
- a holding circuit means connected to the summing means and establishing a timed signal in response to the disable signal to hold a disable signal output during said transition.

9. The polyphase input fault detection system of claim 1, having said sensing means including three single-phase reference transformers and a full wave rectifier connected to each phase and having an amplifying means connected to said rectifier, said amplifying means establishing a first logic signal in response to the intercept of the successive half cycles of the full rectified polyphase output signal and a second logic signal in response to the intercept of successive half cycles of the rectified signal with said detection level with an effective loss of a phase voltage,
- said first converter means being a monostable switching means connected to the output of said detector means and establishing an enable signal in the presence of said first logic signal and a first square wave signal in response to the second logic signal,
- said second converter means being a similar monostable switching means connected to the output of the first converter means and establishing a similar enable signal, said second converter means being actuated by each reset of the square wave signal of the first converter means to establish a square wave signal, and
- said summing means being a second amplifying means having a pair of signal input means connected to said first and second converter means and providing an enable signal in response to said enable signals and a disable signal in response to said square wave signals.

10. The polyphase power circuit of claim 9 having a holding circuit means connected to the second amplifying and establishing a timed signal in response to a selected disable signal.

11. The polyphase input fault detection system of claim 1, having a three-phase rectified supply,
- said sensing means including a full wave rectifier means connected to the incoming phase supply and establishing a full wave rectified output signal,
- a detector means connected to said rectifier means and producing a disable signal if the output voltage is less than the intercept of the successive half cycles of the three-phase rectified output,
- said first converter means being a first monostable signal means connected to the output of said detector means, said monostable signal means being triggered by the intercept of the output voltage and the bias voltage levels and having a reset time greater than the period between the intercept of successive half cycles of the single phase output voltage with said detection level voltage to establish a first square wave signal in response to a single phase output voltage,
- said second converter means being second monostable signal means connected to the output of the first converter means for establishing a similar square wave signal, said second monostable means being triggered by each reset of the first monostable signal means, and
- said summing means having a pair of signal input means connected to said first and second monostable means and establishing a disable signal in response to said square voltage signals.

12. The polyphase power circuit of claim 11, wherein the initial reset period of the first monostable signal means extends beyond the first peaks of the half cycle phase voltage in transition from a three-phase output to a single phase output, and
- a holding circuit means connected to the summing means and establishing a timed signal in response to a disable signal to hold said disable signal output during said initial transition.

13. The polyphase input fault detection system of claim 1, having a three-phase rectified supply,
- said sensing means including three single-phase reference transformers having three-phase connected secondaries, a full wave rectifier means connected to the secondaries and establishing a full wave rectified output signal, a detector transistor connected to said rectifier means and producing a disable signal if the output voltage is below a selected detection level which is less than the intercept of the successive half cycles of the three-phase rectified output, a first monostable circuit connected to the output of said detector transistor, said monostable circuit being triggered by the disable signal and having a reset time greater than the period between the intercept of successive half cycles of the single phase output voltage with said detection level voltage to establish a first square wave signal in response to a single phase output voltage, a second monostable circuit connected to the output of the first monostable circuit for establishing a similar square wave signal, said second monostable circuit being triggered by each reset of the first monostable circuit, and said summing means including an emitter follower transistor having a pair of signal input means connected to said first and second monostable circuits and establishing a disable signal in response to said square voltage signals.

14. The polyphase power circuit of claim 12, wherein the initial reset period of the first monostable circuit extends beyond the first peaks of the half cycle phase voltage in transition from a three-phase output to a single-phase output, and timing capacitor means connected to the emitter follower transistor and establishing a timed signal in response to a selected disable signal.

15. The polyphase input fault detection system of claim 1 wherein a pair of paralleled bridge rectifiers are connected to energize the load and said summing means is connected to control said bridge rectifiers.

16. The polyphase input fault detection system of claim 1 wherein said sensing means includes a level detector connected to said first converter means, said level detector having a biasing means connected to said sensing means whereby said level detector responds to a selected percentage of the peaks input voltage essentially independently of variation in the input voltage.

17. The polyphase input fault detection system of claim 1 wherein said load is a motor connected to the polyphase lines through a pair of paralleled rectifiers for selectively energizing said motor in a motoring mode and a regenerating mode of operation, said sensing means includes a level detector connected to said first converter means, said level detector having a biasing means connected to said sensing means whereby said level detector responds to a selected percentage of the peaks input voltage essentially independently of variation in the input voltage.

18. The polyphase input fault detection system of claim 1 wherein said load is a motor connected to the polyphase lines through a pair of paralleled rectifiers for selectively energizing said motor in a motoring mode and a regenerating mode of operation, wherein said sensing means includes a level detector amplifier connected to said first converter means, said sensing means including a half wave rectifying means connected to said polyphase lines and to said level detector amplifier whereby the amplifier responds to a selected percentage of the peak input voltage essentially independently of variation in the input voltage.

References Cited

UNITED STATES PATENTS

| | | | |
|---|---|---|---|
| 2,900,528 | 8/1959 | Baude | 317—27 X |
| 3,001,100 | 9/1961 | Schuh et al. | 317—31 |
| 3,345,539 | 10/1967 | Ashenden et al. | 317—33 |
| 3,392,322 | 7/1968 | Giannamore | 321—11 |

JAMES D. TRAMMELL, Primary Examiner

U.S. Cl. X.R.

307—127; 317—27, 31, 46; 321—5, 11, 40